United States Patent
Wolff et al.

(10) Patent No.: US 7,584,462 B2
(45) Date of Patent: Sep. 1, 2009

(54) SYSTEM FOR OPTIMIZING APPLICATION START-UP

(75) Inventors: Adam G. Wolff, San Francisco, CA (US); Oliver W. Steele, Brookline, MA (US); David T. Temkin, San Francisco, CA (US); P. Tucker Withington, Plymouth, MA (US)

(73) Assignee: Laszlo Systems, Inc., San Francisco, CA (US)

( * ) Notice: Subject to any disclaimer, the term of this patent is extended or adjusted under 35 U.S.C. 154(b) by 707 days.

(21) Appl. No.: 10/720,726

(22) Filed: Nov. 24, 2003

(65) Prior Publication Data

US 2005/0114871 A1    May 26, 2005

(51) Int. Cl.
*G06F 9/45* (2006.01)
(52) U.S. Cl. .................. 717/154; 717/140; 717/151
(58) Field of Classification Search ............... 717/140, 717/151–161; 713/1, 2
See application file for complete search history.

(56) References Cited

U.S. PATENT DOCUMENTS

| | | | | |
|---|---|---|---|---|
| 4,912,628 A | * | 3/1990 | Briggs ..................... 718/100 |
| 5,987,256 A | * | 11/1999 | Wu et al. .................. 717/146 |
| 6,295,643 B1 | * | 9/2001 | Brown et al. ............... 717/148 |
| 7,093,086 B1 | * | 8/2006 | van Rietschote ........... 711/161 |
| 7,191,441 B2 | * | 3/2007 | Abbott et al. ................ 718/1 |
| 2003/0195923 A1 | * | 10/2003 | Bloch et al. ................ 709/203 |
| 2004/0044989 A1 | * | 3/2004 | Vachuska et al. ........... 717/108 |
| 2005/0071809 A1 | * | 3/2005 | Pulley ....................... 717/108 |

OTHER PUBLICATIONS

Killijian et al., "Portable Serialization of CORBA Objects: a Reflective Approach," 2002, ACM, p. 68-82.*
Sapuntzakis et al., "Optimizing the Migration of Virtual Computers," 2002, ACM, p. 377-390.*
Breg et al., "Java Virtual Machine Support for Object Serialization," Jun. 2001, ACM, p. 173-180.

* cited by examiner

*Primary Examiner*—Wei Y Zhen
*Assistant Examiner*—Qing Chen
(74) *Attorney, Agent, or Firm*—Vierra Magen Marcus & DeNiro LLP

(57) ABSTRACT

A method for decreasing a computer application's start-up time. In one aspect, the method comprises: creating a serialized representation of application objects in a runtime environment; building an object code file using the serialized representation; and providing the application to a new runtime environment. In another embodiment the method may include the steps of: compiling an application provided in a source language; initializing the application in a runtime environment; and creating a serialized representation of the application.

55 Claims, 7 Drawing Sheets

Fig. 5

```
                                                                    600
                                                                  ┌──
    <_root width="2039.5" height="1186.85" >\par
     <m n="m4" y="57" xscale="830" yscale="516" depth="20" link="LzMask"
    >\par
     <m n="mask_sub" xscale="12.0481927710843" yscale="19.3798449612403"
    depth="contained" link="contained" >\par
602 ┌ <m n="belowmask" depth="11" link="empty" >\par
    └ <m n="m0" visible="false" depth="10" link="empty" >\par
       <m n="m2" depth="14" link="empty" >\par
604 ─┘ <m n="m2" x="-21" y="-1" depth="14" link="empty" >\par
        <m n="m1" depth="12" link="ibutton_icon" >\par
606 ─┘ </m>\par
                   •
                   •
                   •
        <o n="_root" m="_level0" sid="0" x="true" >
608 ─┘   <b n="haveparrefs" v="true" />
         <b n="havemyrefs" v="true" />
         <n n="s" v="-1" />
         <s n="k" v="advancetable" />
         <s n="_Copyright" v="Portions of this file are copyright  (c ) 2001-
    2003 by Laszlo Systems, Inc .  All rights reserved ." />
         <c n="LzSerializer" t="object" d="true" sid="" />
         <n n="__dbg_objseq" v="1" />
         <n n="_dbg_objseq" v="0" />
         <b n="_dbg_insideUndefinedMethod" v="false" />
         <b n="_dbg_insideNotFunction" v="false" />
         <b n="_dbg_insideUndefinedVariable" v="false" />
         <b n="_dbg_insideUndef2" v="false" />
         <b n="_dbg_insideUndef1" v="false" />
         <b n="_dbg_log_all_writes" v="false" />
         <b n="_dbg_isLoading" v="true" />
         <s n="_dbg_saved_msgs" v="" />
         <s n="krank" v="true" />
         <s n="lzt" v="swf" />
         <s n="$version" v="WIN 7,0,14,0" />
         <o n="frameupdate" m="_level0 .frameupdate" sid="1" >
610 ─┘   <n n="s" v="-1" />
         <n n="i" v="3" />
         </o>
         <o n="lzpreloader" m="_level0 .lzpreloader" sid="2" >
612 ─┘   <s n="p" v="height" />
         <s n="name" v="splash" />
         <b n="hideafterinit" v="true" />
         <n n="ht" v="600" />
         <n n="wd" v="830" />
         <s n="heartbeat" v="" />
          <o n="_heartbeat" m="_level0 .lzpreloader ._heartbeat" sid="3" >
614 ─┘
```

Fig. 6A calendar.lzx
<!-- Copyright 2002-2003 Laszlo Systems, Inc. -->
    -->
<canvas title="Laszlo Calendar" bgcolor="#1E3A49" width="830" height="600">
702
　　<include href="cal-button.lzx">
    <include href="resources.lzx">

<!-- INCLUDES -->
    <include href="vscrollbar.lzx">
        ⋮

```
<class name="calButton" clickable="true">
    <attribute name="label" value="" type="string">
    <attribute name="icon" value="" type="string">
    <attribute name="divider" value="3" type="number">
    <attribute name="leftcap" value="oval" type="string">
    <attribute name="rightcap" value="oval" type="string">
    <attribute name="leftinset" value="0">
    <attribute name="rightinset" value="0">
    <attribute name="yoffset" value="2" type="number">
    <attribute name="normalRsrcNumber" value="1" type="number">
    <attribute name="overRsrcNumber" value="2" type="number">
    <attribute name="downRsrcNumber" value="3" type="number">
    <attribute name="deselectRsrcNumber" value="4" type="number">
    <attribute name="width" onset="this.widthSetter(width);">
    <attribute name="keepinitialwidth" value="false">
    <attribute name="enabled" value="true">
    <attribute name="mouseisdown" value="false">
```

```
802 ─── <o n="1" sid="906" >
804 ─── <s n="name" v="calButton" />
        <o n="attrs" sid="907" >
806 ───┌─ <b n="clickable" v="true" />
       │  <s n="icon" v="iconWeek" />
       │  <s n="label" v="week" />
810   ─┤  <s n="leftcap" v="shear" />
       │  <s n="rightcap" v="shear" />
       └─ <n n="textwidth" v="27" />
          <o n="events" sid="908" >
           <o n="onclick" FID="calendar_lzx$105_76_onclick_event" >
            <s n="name" v="calendar_lzx$105_76_onclick_event" />
            <o n="prototype" sid="910" >
             <o n="constructor" FID="calendar_lzx$105_76_onclick_event" />
            </o>
           </o>
          </o>
          <o n="__proto__" r="903" />
         </o>
        </o>
        <o n="2" sid="911" >
820 ───  <s n="name" v="calButton" />
         <o n="attrs" sid="912" >
822 ───   <b n="clickable" v="true" />
          <s n="icon" v="iconMonth" />
          <s n="label" v="month" />
          <s n="leftcap" v="shear" />
          <n n="textwidth" v="31" />
          <o n="events" sid="913" >
824 ───   <o n="onclick" FID="calendar_lzx$107_82_onclick_event" >
            <s n="name" v="calendar_lzx$107_82_onclick_event" />
            <o n="prototype" sid="915" >
             <o n="constructor" FID="calendar_lzx$107_82_onclick_event" />
            </o>
           </o>
          </o>
```

```
...
      <o n="constructor" FID=""core/LzNode.as"#17/11()9"  sid="739" >
       ...
       <s n="classname" v="LzAnimator" />
902     ...
       <o n="proto" sid="740" >                              Fig. 8
        <n n="endPoleDelta" v="0.25" />
        <n n="beginPoleDelta" v="0.25" />
        <o n="class" r="739" />
        <s n="classname" v="LzAnimator" />
        <o n="_sPrototypeRef" r="740" />
        <o n="setters" sid="741" >
         <s n="to" v="setTo" />
         <s n="motion" v="setMotion" />
         <o n="__proto__" sid="742" >
          <s n="start" v="setStart" />
          <s n="ease" v="setEase" />
          <o n="__proto__" r="166" />
         </o>
        </o>
        <o n="getters" sid="743" >
         <o n="__proto__" sid="744" >
          <o n="__proto__" r="168" />
         </o>
        </o>
        <o n="defaultattrs" r="585" />
        <o n="_super" sid="745" >
         <b n="start_oninit" v="true" />
         <s n="classname" v="LzAnimatorGroup" />
         <o n="_sPrototypeRef" r="745" />
         <o n="class" FID=""core/LzNode.as"#17/11()9"  sid="746" >
          <o n="makeDefaultConstructor" FID=""core/LzNode.as"#17/11" />
          <o n="isExtendedBy" FID="LzNode.isExtendedBy" />
          <s n="classname" v="LzAnimatorGroup" />
          <s n="name" v=""core/LzNode.as"#17/11()9" />
          <o n="proto" r="745" />
          <o n="prototype" r="745" />
         </o>
         <o n="setters" r="742" />
         <o n="getters" r="744" />
         <o n="defaultattrs" r="586" />
         <o n="_super" r="169" />
         <o n="initialize" FID="LzAnimatorGroup.prototype.initialize" >
904       <s n="name" v="LzAnimatorGroup.prototype.initialize" />
          <o n=")4proto" sid="748" >
          </o>
          <o n="prototype" sid="749" >
           <o n="constructor" FID="LzAnimatorGroup.prototype.initialize" />
906       </o>
         </o>
         <o n="init" FID="LzAnimatorGroup.prototype.init" >
908       <s n="name" v="LzAnimatorGroup.prototype.init" />
          <o n="prototype" sid="751" >
           <o n="constructor" FID="LzAnimatorGroup.prototype.init" />
          </o>
         </o>
         <o n="setStart" FID="LzAnimatorGroup.prototype.setStart" >
910       <s n="name" v="LzAnimatorGroup.prototype.setStart" />
          <o n="prototype" sid="753" >
           <o n="constructor" FID="LzAnimatorGroup.prototype.setStart" />
          </o>
         </o>
         ...
```

_US 7,584,462 B2_

SYSTEM FOR OPTIMIZING APPLICATION START-UP

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

BACKGROUND OF THE INVENTION

1. Field of the Invention

The present invention is directed to decreasing the start-up time of a computer application in a runtime environment.

2. Description of the Related Art

A standard design goal in computer applications is optimal performance. The performance of an application begins with the amount of time the application takes to load into the operating memory of a processing device and prepare for user input. Many applications require time to call methods and functions, and construct objects. This problem occurs in interpreted applications, such as JAVA and other common programming languages, as well as non-interpreted applications.

As generally understood, applications are usually created in a source language. During a compiling process, statements written in the source language are converted into machine language or "code" that a computer's processor uses.

A stored program that is executed on a computer is loaded into the computer memory (from a file system or a communication stream such as an internet connection). The application executes initialization code, which initializes the application's global data. The application also executes code that depends upon external events: user events, network events, or stored data separate from the stored data of the application.

The period of time between the command to initiate the program, and the time at which the program commencing processing to external events, depends upon both the time it takes to load the program into memory and the time that it takes to execute initialization code. Any technique that reduces the amount of time spent executing initialization code will decrease the amount of time until the application process external events. For an interactive program such as a desktop application or a rich internet application, this decreases the amount of time between the user event that launches the application (opening a file or choosing a program from a menu on a desktop operating system, or clicking on a link or otherwise requesting the URL that links to the application or an HTML page that embeds it), and the period during which the application is responsive to user events. This is particularly important in environments where code execution is slow, such as virtual machines with bytecode interpreters such as older JAVA implementations and such as the FLASH player. In object-oriented programming languages, bytecode can run on any computer system platform for which a virtual machine or bytecode interpreter is provided to convert the bytecode into instructions that can be executed by the actual hardware processor. Using this virtual machine, the bytecode can optionally be recompiled at the execution platform by a just-in-time compiler. Further, computing the initial state of the application can be time consuming because some of the calculations are complex and because values must sometimes be recomputed.

Some applications attempt to improve startup speed by recording an image of the application in a processing device's physical memory, and using that image to start the application in a processing device. A familiar example of this is the Microsoft Windows® operating system's hibernate feature. When enabled, this feature copies everything in a computer's random access memory (RAM) to the hard drive and then shuts down the hardware. When one turns the hardware back on, Windows restores the system to the state it was in when one started hibernation.

Two object oriented programming languages—LISP and SMALLTALK—include the ability to take a similar "snapshot" of their runtime execution. However, in these implementations, the development environment was recorded as well. For example, in the SMALLTALK programming language, the current state of the GNU SMALLTALK virtual machine is saved along with the objects created. While this means that all objects are saved to a file that can be loaded rapidly at a later point in time, the file is large due to the inclusion of the runtime.

In the LISP programming language and the SMALLTALK programming language, snapshots could be generated in a variety of ways: by adding an instruction that reads a file that represents the initial state of memory, by compressing this file using data compression techniques, or by serializing the objects in memory. However, these techniques were used in the context of "code evolution", where a stored program that is a development environment (compiler, editor, code libraries) for the target language and is written in that same language is extended to contain an in-memory representation of the application as well as the development environment; this in-memory representation is saved to disk using one of the techniques above (serialization, compression, or a raw representation of memory).

SUMMARY OF THE INVENTION

The present invention, roughly described, pertains to a method for decreasing a computer application's start-up time. In one aspect, the method comprises: creating a serialized representation of application objects in a runtime environment; building an object code file using the serialized representation; and providing the application to a new runtime environment.

In a further aspect, the method includes reading from a runtime memory space a description of each object of a running application. In a further embodiment, the runtime environment is a virtual machine, and in one particular embodiment, a FLASH renderer. In yet another aspect, the invention includes enumerating a description of each object of a running application using reflection.

Additionally, the method may include detaching each object from an object hierarchy and creating a description of each slot in said object. In a further aspect, the step of creating may be performed in the runtime or in a different runtime.

In another embodiment, the invention comprises a method for providing an optimized application. The method may include the steps of: compiling an application provided in a source language; initializing the application in a runtime environment; and creating a serialized representation of the application.

In yet another embodiment, the invention is a method of operating an application. In this embodiment, the method may comprise the steps of requesting an application from an application source server; and receiving object code of a serialized description of the application from the source server, the object code including instructions for creating a runtime memory state of the application.

In a still further embodiment, the invention comprises one or more processor readable storage devices having processor readable code embodied on said processor readable storage device. The processor readable code is for programming one or more processors to perform a method. The method may comprise the steps of: creating a serialized representation of application objects in a runtime environment; building an object code file using the serialized representation; and providing the application to a new runtime environment.

In another aspect, the invention is a method of developing an application. In this aspect, the method comprises the steps of: compiling first object code for an application; loading the application into a first runtime environment; creating a serialized representation of a memory space in said first runtime environment; building second object code using said serialized representation; and deploying said second object code In a further aspect, the step of compiling is performed on an interpreted language application. Still further, the step of creating may be performed by calling at least one function from said first runtime environment.

In another aspect, the invention is a method including the steps of: receiving from a runtime environment a serialized representation of objects in a memory space of the runtime environment; and building an object code file using the serialized representation and a compiled object code file used to create the memory space.

In this aspect, the method may further include providing the compiled object code file used to create the memory space to the runtime environment prior to said step of receiving. Additionally, the method may include initializing a serialization process in a separate memory space to create said serialized representation.

The present invention can be accomplished using hardware, software, or a combination of both hardware and software. The software used for the present invention is stored on one or more processor readable storage media including hard disk drives, CD-ROMs, DVDs, optical disks, floppy disks, tape drives, RAM, ROM or other suitable storage devices. In alternative embodiments, some or all of the software can be replaced by dedicated hardware including custom integrated circuits, gate arrays, FPGAs, PLDs, and special purpose computers.

These and other objects and advantages of the present invention will appear more clearly from the following description in which the preferred embodiment of the invention has been set forth in conjunction with the drawings.

BRIEF DESCRIPTION OF THE DRAWINGS

The invention will be described with respect to the particular embodiments thereof. Other objects, features, and advantages of the invention will become apparent with reference to the specification and drawings in which:

FIG. 5 is a code listing illustrating a portion of a serialized application in accordance with the present invention.

FIG. 6A is a source code listing of an exemplary portion of an application.

FIG. 6B is a source code listing defining a class included in the application of FIG. 6A.

FIG. 7 is a source code listing of objects serialized in accordance with the method of the present invention.

FIG. 8 is a code listing illustrating a portion of classes functions serialized in accordance with the method of the present invention.

DETAILED DESCRIPTION

Figure 1:
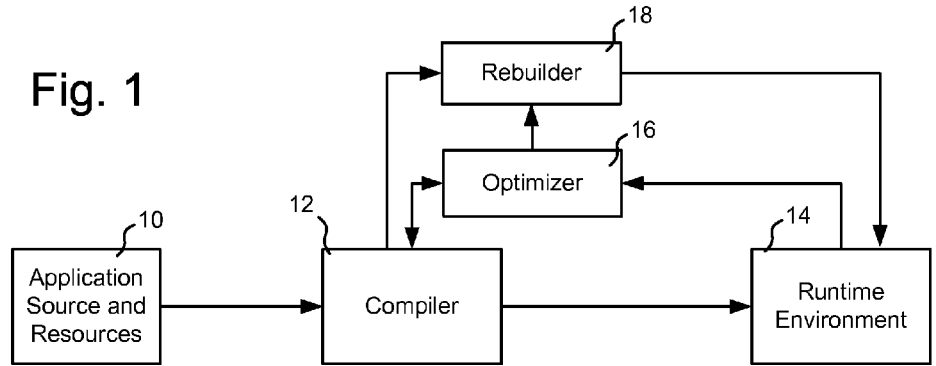
FIG. 1 is a block diagram of one embodiment of the present invention.

The present invention provides a unique method for increasing the speed with which an application can be initialized by a runtime environment. In one aspect, the invention applies to the start-up speed of any application created in a source language and the techniques of the invention can be applied to both interpreted and non-interpreted applications as well. The invention may be used with any runtime environment, including those employing a virtual machine or bytecode interpreter utilized on a processing system. However, a virtual machine or other interpreter is not required. The invention may be implemented with a presentation server and presentation rendering engine in accordance with the teachings of co-pending application Ser. No. 10/092,010, but has applicability to any application.

The present invention reduces the amount of time that is spent initializing the application's global data. In one aspect, the technique is to run the initialization code once and to record the state of the application at the end of this "optimization run". The initialization code in the initial stored program is compiled from the application source code and linked from libraries that the application uses, using the same mechanism that is used to compile and link non-initialization code (code that is used during the reactive phase of the program, after initialization is complete). This initialization code is replaced with "optimized" code that recreates the initial state of the application and that is generated by examining this state after the optimization run. This code that recreates the initial state of the application could be generated in a variety of ways: by adding an instruction that reads a file that represents the initial state of memory, by compressing this file using data compression techniques, or by serializing the objects in memory.

In general, applications are compiled prior to delivery to the runtime environment. The application assets and object code are then loaded into the runtime, where environment objects and relations are built. At a point after the application is loaded by the runtime environment and before user interaction, an application awaits user input.

The method of the present invention utilizes this state of the application in the runtime environment to provide a means for increasing the speed at which a user can start the application. In general, a snapshot of this application state is taken, recorded and used, with an object code compiled from the original application source to create optimized object code which replicates the memory state of the runtime when the optimized code is loaded into a new runtime environment. In contrast to the prior art, the present invention includes the ability to run any of the steps in a separate process from the runtime execution engine. In addition, the application's original object file is used as a separate input to create optimized object code to recreate the snapshot state of the application. This technique can be applied to applications that do not embed a compiler or other code that implements the snapshot creation process. This technique can be applied to execution engines that are not capable of serializing the contents of some objects that are represented in the object—this arises if the memory introspection facilities of code running in the runtime execution engine are limited. Yet another advantage is that the size of the serialized data is smaller than that used in implementations such as LISP and Smalltalk.

In the present invention, unlike in the prior art, the application state that does not depend on a history of interaction with external resources (people, filesystem state) is stored, with the effect that the same stored program can be started multiple times, on different machines or on the same machine. For example, the saved state of a Microsoft® Windows® machine can be used only once to pick up where things left off. The technique described herein is applicable to applications that are not written in the same programming language as the development environment, that are written for a different platform from the development environment (a different operating system, or a different virtual machine execution environment). The libraries that the application links against may be different than the libraries that the development environment uses. The invention may be used with platforms that do not support the execution of the development environment because it is too large or has not been ported to the target platform. For example, the techniques of the invention may be used with embedded devices such as phones and other handheld devices and set-top boxes. The present invention is further distinguished in that, instead of loading the application code into the development environment's process, it creates a separate file and executes that as a separate process, possibly on a different machine.

Moreover, the techniques described herein are not specific to any implementation of bytecode interpreters, bytecode interpreted execution engines or object-oriented languages. Also there is nothing specific in the patent to the delivery of applications over the internet or the download over the internet.

In one aspect, the present invention may be utilized with the system of copending application Ser. No. 10/092,010, which has been published as U.S. Patent Application Publication No. 20030195923 on Oct. 16, 2003, and for convenience, aspects of the invention will be periodically explained in connection with this application. In the co-pending application, a presentation server generates highly optimized/compressed object code for a given presentation renderer. A presentation renderer is a software environment, hardware, set of one or more software programs, etc. that can display graphics and play sound. In this example, the present invention builds on the process for generating such code. In such aspect, the invention may be used to optimize the application provided by the presentation server prior to delivery to a presentation renderer for execution.

Figure 2:
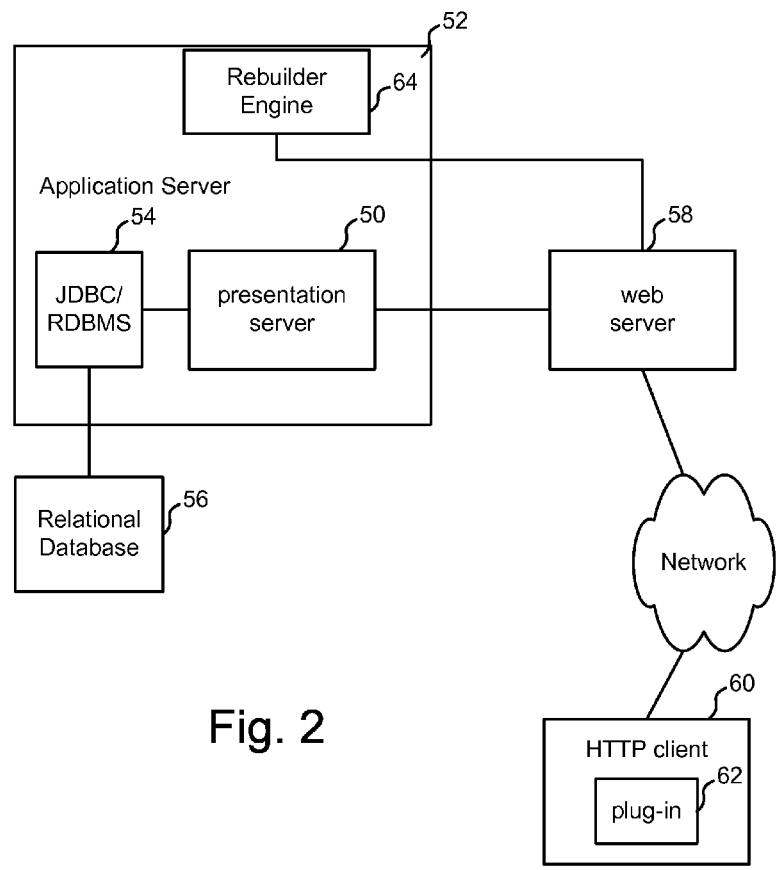
FIG. 2 is a block diagram of a second embodiment of the present invention.

FIG. 1 is a block diagram providing a high-level description of one exemplary implementation of the present invention. FIG. 2 shows a more detailed block diagram which implements the invention in the context of the presentation system.

FIG. 1 shows a set of application source files and resources 10 available to a compiler 12. The output of the compiler is available to a runtime environment 14 and may be provided responsive to a request for the compiler's output. The various elements can be included within a single processing device, or any combination of multiple processing devices. When provided on separate processing devices, the devices may communicate via network, dedicated connection, wireless connection, or any other connection that is suitable for appropriate communication. The output of the compiler 12 may be provided directly to the runtime environment 14 or stored on a storage device (not shown), and retrieved later by the environment 14. Also shown are an application optimizer engine 16 and a rebuilder engine 18. The optimizer engine 16 may be called from the runtime 14 as a function, or run in a separate process. The output of the compiler 14 is available to the optimizer engine 16, and may be provided directly thereto or retrieved from a storage device. The output of the optimizer 14 is also available to the rebuilder engine 18, as is the output of compiler 12. Both may be provided directly or from stored versions. In general, the optimizer retrieves a description of the application memory state in the runtime 14, and provides it to the rebuilder 18. The rebuilder generates the optimized object code which can be executed in to runtime 14 more rapidly and create the snapshot application state.

FIG. 2 is a more detailed block diagram of the embodiment of FIG. 1 showing how the elements of FIG. 1 may be implemented in the context of a presentation system. FIG. 2 shows presentation server 50 implemented as a JAVA Servlet that compiles server located mark-up language description files and data into object code and hosted in application server 52. In one embodiment, presentation server 50 generates object code for a client presentation renderer 62. The presentation renderer 62 can be generic software for providing a user-interface or can be specific software for the purpose of communicating with presentation server 50. In one embodiment, client presentation renderer 62 is a Macromedia FLASH Player embedded in a web client as a plug-in. Presentation server 50 can be hosted by any standard JAVA Servlet implementation. When hosted in a J2EE server, the presentation server takes advantage of services that are available including JDBC and JCA. Application Server 52 also includes JDBC to RDBMS services 54, which is in communication with relational database 56. Other types of data sources, other than a relational database can also be used. Presentation server 50 receives requests and sends responses via web server 58, which is in communication with clients via a network. That network can be any standard network known in the art, including the Internet, a LAN, a WAN, etc. For example, FIG. 2 shows an HTTP client 60 (e.g. browser) with plug-in 62 (e.g. FLASH Player) in communication with presentation server 50 via web server 58. Also shown in FIG. 2 is a rebuilder engine 64 which is provided on the application server 52. The rebuilder engine provides an optimized application to the webserver 58 for delivery to the client 60 when the client makes a request for such an application.

In a localized embodiment, a call for an application will retrieve the compiled object code for that application. This code will contain media assets, code blocks and instructions to created relations between the objects. This object code will be compiled from the assets to the application—text files, media assets (image audio and movie or animation files), and binary distributed library files. Some systems do not use binary distributed library files.

Figure 3:
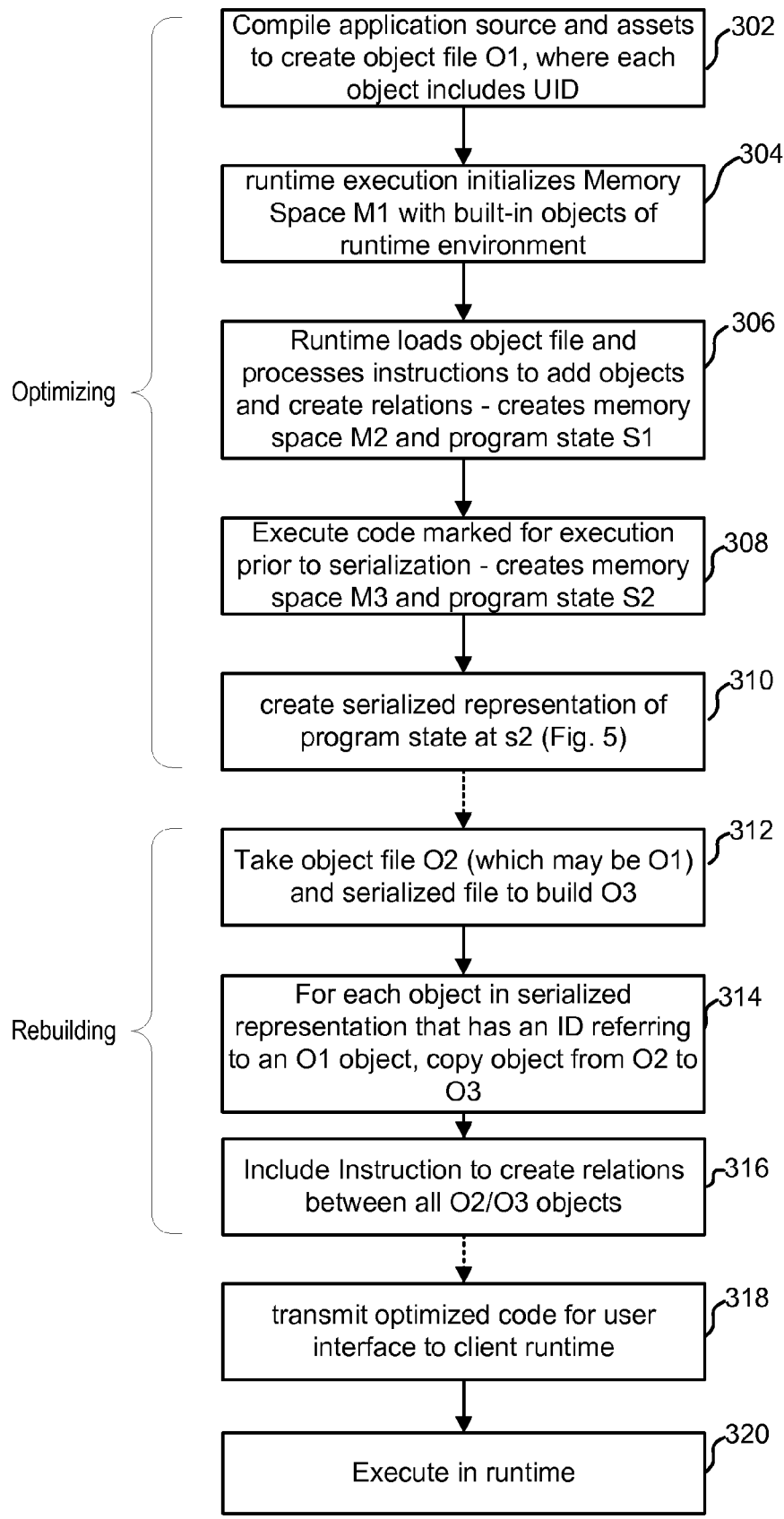
FIG. 3 is a flow chart describing one embodiment of a process for implementing the present invention.

FIG. 3 shows one embodiment of the method of the present invention. Two general process stages are shown therein: serializing and rebuilding. Steps 302, 304, 306, 308 and 310 generally represent the optimizing portion of the process. At step 302, the developed application assets are accessed and compiled in order to create executable code (object file (O1)) for the runtime environment. In one embodiment, this application runtime may be a virtual machine such as the presentation renderer. During this step, each object is marked with a unique identifier (UID) that can be parsed from the object file and is available to the optimization process, as discussed below. At step 304, the runtime execution engine initializes a first memory space (M1) that represents a first program state (S1) which contains built-in objects of the runtime environment.

At step 306 the executable code is provided to the runtime environment which loads the object file (O1) and processes these instructions in order to add objects and create relations within the memory space. The result is a modified memory space (M2) that includes a second program state (S2).

Next, at step 308, the runtime execution engine executes any portions of the program that have been marked for execution prior to the snapshot process. In one aspect, the invention waits for execution of these marked sections of the program before performing subsequent steps, allowing the designer of the source program to determine in advance the state of the application on start-up after the optimization process is complete. The program is now in a third program state (S3) and the runtime has a third memory space (M3). The initialization code results in establishing an initial state of the program which consists of the initial values of all the global variables. Because these values are objects, they may themselves be made up of aggregate values, either named or enumerated, and each of those values similarly may be an aggregate. It is possible for there to be circular references, whereby a value may refer to one of its own ancestor values. Finally, there are leaf values, which are not aggregates, but represent primitive values, such as numbers, strings, or booleans.

At step 310, a serialized representation of the program state S3 is created. In one embodiment the runtime execution engine executes a function or set of functions that create the serialized representation. In an alternative embodiment, creation may occur using a separate application or process. The serialized representation is a description of each object created in program state S3. Objects in the runtime memory space M3 can be identified by their UID and the representation contains relations between objects.

The serialized representation may be stored as a text file, an XML file, or in another format, for later use by the rebuilder engine. Alternatively, the representation may be provided directly to a rebuilder engine. The dashed line between steps 310 and 312 in FIG. 3 indicates that the step of rebuilding is both optional, and separate in time from the optimizing process. The serialized representation created at 310 represents the network of objects in the memory of the application once the application has finished initialization.

When serialization begins, execution of the user's program is halted. This means that it receives no user-input and no system events while serialization occurs. To serialize the initial state of the program, the serializer enumerates the global values and recursively enumerates their values. This enumeration is generally referred to as "reflection". In most contexts, reflection is a term used to describe a program's ability to examine or "introspect" upon itself, and manipulate internal properties of the program. For example, it's possible for a JAVA class to obtain the names of all its members and display them.

In the present invention, each object is assigned a unique identifier when enumerated so that if it is seen again in the recursive process (due to a circular reference) it can be referred to by the unique identifier and not re-enumerated. In the process, serialization cannot refer to an object that has not yet been defined. In practice, this means that when a previously-unserialized object is encountered as the value of a slot that is being serialized, it must be serialized on the spot. If the serialization did contain forward references, then the rebuilder process would need to take the extra step of reordering them in the regenerated code.

As each value is enumerated, the serializer writes to a file the name of that value relative to its parent, the identifier for the value, the type of the value, and if it is a primitive value a string representing that value (the actual string if a string, the string that is the numeric value of the value if a number, or one of the string 'true' or 'false' if a boolean value), or if it is an aggregate value the components of the aggregate are enumerated and serialized recursively. If a previously visited value is encountered when enumerating, the unique identifier is emitted and the value is not further enumerated. If a function value is encountered while enumerating, the name of that function is emitted as a unique identifier (the uniqueness of function names is guaranteed by the compiler), and if the function has additional components, those are enumerated. Serialization is complete when all the global values and their components have been enumerated. The file that records the enumerations is written as XML, which makes it easier to analyze, but this is not a requirement of the process.

There is also a provision for a programmer to annotate the enumeration in two ways: the programmer can dictate that certain values are not to be enumerated ('transient' values such as the current time), or that a specific fragment of code should be executed when a value is reconstructed (a 'resolver' to reinitialize the value at load time).

The rebuilding process generally occurs through steps 312, 314 and 316. At step 312, the rebuilder engine takes an object file (O2) and the serialized representation to build a new optimized object file O3. In one embodiment, O2 may be the same as O1, a different object file compiled from the original application assets. Object file O2 contains the compiled code and assets of the application and is used with the serialized representation to create a new object file O3 that, when loaded into the runtime execution engine will create a program state that is isomorphic to S2. In other words, there is a relationship between objects and relations in S2 to objects and relations in S3 such that, for each object (obj2) with properties P in S2, there is an object (obj3) in S3 that has properties P; and, for each object (obj2a and obj2b) and relation R in S2 such that R(obj2a,obj2b) in S2, there is a pair of objects obj3a, obj3b such that R(obj3a,obj3b) in S3.

At step 314, for each object (obj1) in S that has an identifier that refers to an object identified in O1, the object with this identifier in O2 is copied from O2 to O3. In step 316, instructions are placed in O3 that cause the runtime execution engine to create the same relations between the object (obj3) that O3 causes the runtime execution engine to create, and the other objects (objs3) that O3 causes the runtime to create, that exist between (obj1) and the corresponding objects (objs1) in S2.

At step 318, the object code file O3 may be transmitted to the client runtime and executed by the runtime in step 320. The execution of the object code file O3 occurs much more rapidly than required to build each and every object function and method in the runtime using O1. In executing the optimized application, all values are already calculated and are simply assigned by the runtime environment. As a result, the optimized application is displayed in a runtime more rapidly than would occur using the original compiled object code of the application.

To reconstruct (rejuvenate) the initial state of the program, the file that records the enumeration of the initial state of the program is analyzed and a new program is emitted that will recreate the global values (and their components) in a structure that is isomorphic to the original state, modulo any annotations provided by the programmer. Reconstruction proceeds by creating objects according to the recorded type and then assigning component values according to their recorded name and value. When analysis determines that an object is referred to circularly or more than once, the reconstruction will enter it in a table that maps unique identifiers to values so that the connectivity of the object tree is faithfully restored. Functions are extracted from the original program and emitted when they are referenced. Any 'resolve' annotation for an object is emitted once the object has been constructed. The resulting program, when loaded, will recreate the initial state of the input program (after initialization has completed), ready to respond to external events.

As noted above, the serialization step 310 may be called as a function of the runtime (built into the application), or a separate process to create the serialized representation in step 310. As a separate process, it inspects the memory state of the application. In a further embodiment, different runtime execution engines can perform steps 304-310, and to run the application in step 320. An example of this would be to simulate the behavior of the deployment platform in order to compute the initial application state. For example, the optimization process of FIG. 3 may be performed on any processing device shown in FIG. 2 (including, for example, the application server 52). In one embodiment, it is performed on a separate processing device before the application is created by the rebuilder engine.

Figure 4:
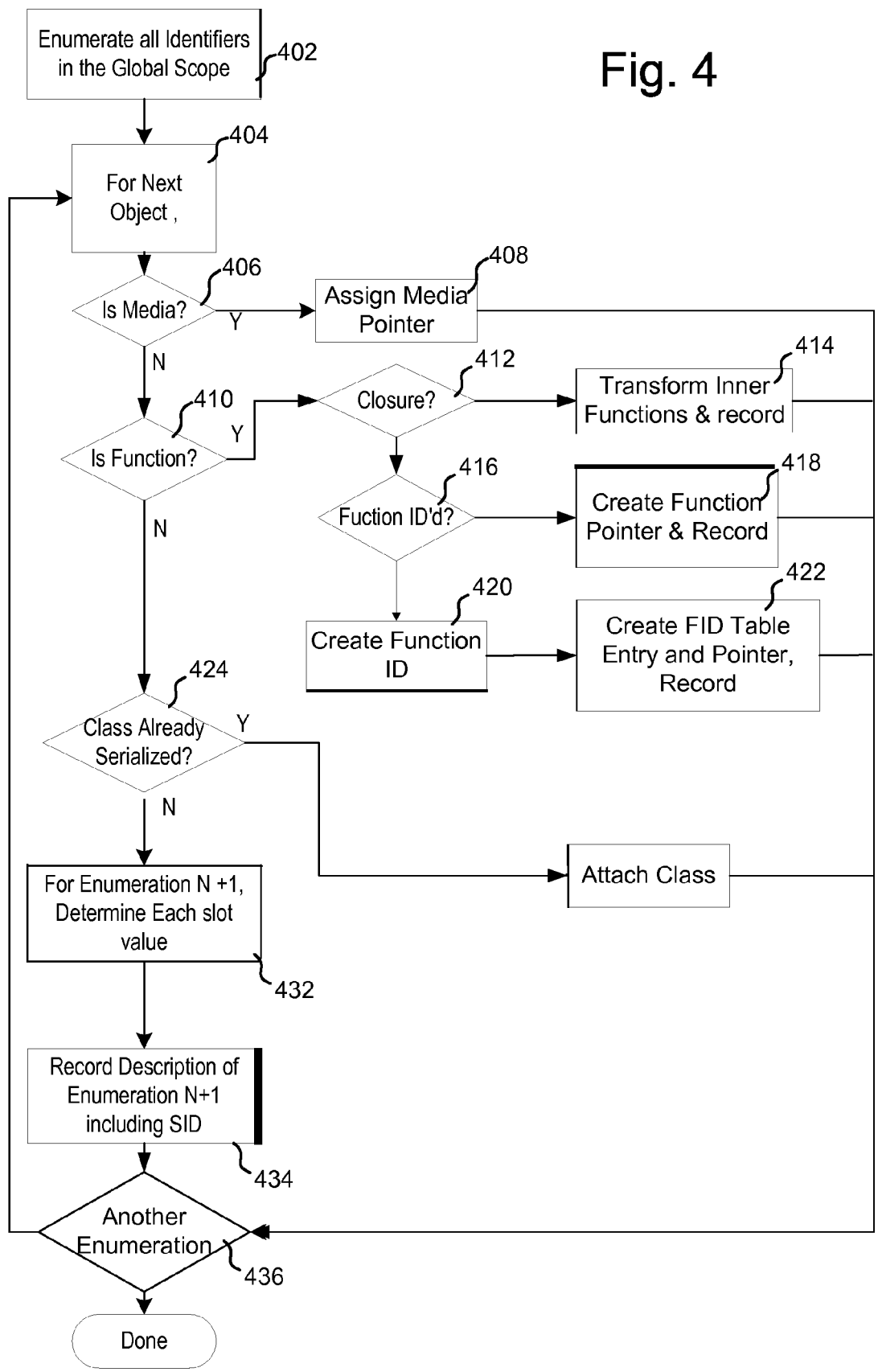
FIG. 4 is a flowchart representing another embodiment of a process for implementing the present invention.

FIG. 4 shows a method for performing the serialization process (step 310 of FIG. 3) in the present invention. Initially, at step 402, all object identifiers in the global scope are enumerated. At step 404, the first (or next) enumeration in the global scope is identified. At step 406, a determination is made as to whether the enumeration identified in step 404 identifies a media asset. If so, a pointer to the media asset is recorded in the serialized representation at step 408 and the method seeks the next enumeration at step 436. If the enumeration does not identify media at step 406, then a determination of whether enumeration references a function is made at step 410. If a function is referenced, a determination of whether a closure is referenced is made at step 412. A closure is a pair of a function and a variable binding environment within which the function is executed. The function code is present in the object file. As explained in additional detail below, closures are transformed into objects which can be handled by the rebuilder. If a closure is enumerated, then the inner functions of the closure are transformed at step 414, and recorded in the serialization, and the next enumeration analyzed at step 436.

If the function is not a closure, then the method determines whether a unique function ID (FID) for the function has been established at step 416. In a unique aspect of the present invention, functions associated by an application are uniquely identified. Each function is provided with an (FID) which is associated with the function. An FID data store is maintained on a processing device, such as the presentation server 50, wherein each function is linked to its function ID. When the rebuilding the application, requests for a particular function are retrieved by looking it up in the FID table. If an FID has been established, then the method records the placement of the function relative to the object at step 418. If no FID has been established, then the method creates an FID at step 420 and creates an entry in an FID table and records this entry in the serialization record, in step 422.

If the enumeration does not identify a function at step 410, then at step 424 the method checks whether the object has already been serialized. If the object has already been serialized, then a pointer to the object is attached to the object at step 426 and the method loops back via step 436. If it has not, then at step 432, for the object identified in step 404, the state of the object is determined by reading the values of the slots of each object. A description of each object including the value of each object slot is then written at step 434. This description includes a serialization identifier (SID) which is associated with each object or class serialized by the method of the present invention. The method then loops back at step 436 and takes the next enumeration in the global scope at step 404.

A portion of one embodiment of a serialized representation created by the process described with respect to FIG. 4 is shown in FIG. 5. The example shown in FIG. 5 is generated from a MACROMEDIA FLASH runtime executing the output of a presentation server compiled a mark-up language description of a content application. In other embodiments of the invention, other types of source languages may be used. In this mark up language example, an application source file may contain at most one root element. In source application files, an element such as a canvas element defined in co-pending application Ser. No. 10/092,010 defines properties of the global canvas, which is the root of the runtime view hierarchy; all other views are directly or indirectly contained within the canvas element.

In the example of FIG. 5, the application is a calendar application. A root serialization identifier 600 is the first line of the description. A number of media object pointers 602, 604, 606 are shown. Each media object includes an ID (for example "M0") and attributes associated therewith between the "<...>". After all media assets are described, a root object 608 begins a listing of application objects and relations. The root object has a number of slots identified between brackets following the root object. Each slot may include a Boolean value "b", numerical value "n", serial value "s", or object "o". A next object is identified at line 610. The object has a serialization ID of '1' and a name of "frameupdate." Two numerical slots are recorded, each with a name "n=" and numerical value "v=". A next object 612 is identified as "lzpreloader" having serialization ID of '2'. This object has three string slots, two numerical slots and a Boolean slot. The next object 614 is nested in the "lzpreloader" object 612. Like an object 612, it would have its own set of slots and nested objects. The method continues on until every object enumerated in the global scope is identified and serialized in this manner.

An example of how classes are recorded in the serialized representation is shown in FIGS. 6A, 6B and 7. FIG. 6A is a source code portion of an application provided in a mark-up language such as that described in copending application Ser. No. 10/092,010. This portion includes a header portion of the source code description and defines a class included at line 702 of "cal-button.lzx." The definition of the cal-button.lzx class is shown in FIG. 6B. As shown in Figure, the class "cal-button" has a number of attributes, including label, icon, divider, left cap, right cap, left insert, right insert, Y offset, and others.

FIG. 7 shows a portion of a serialized application including objects created from the cal-button.lzx class. A first object 802 has a serialization ID 906 and has one string value slot of the name of the "cal-button" class as identified at line 804. The attributes (n="attrs") object 806 has series of attributes identified by SID 907 which are listed by lines identified at reference number 810. The values of each slot are identified along with the component of the object in accordance with the identifiers described above. Another instance of the cal-button class is identified at line 820 along with its attributes object 822 and events object 824. It should be understood that the two objects identified in FIG. 7 are but a portion of the serialized code beginning at the root level (shown in FIG. 5) which continues on until each and every object in the global scope is identified and written in a serialized fashion.

FIG. 8 shows an example of functions are identified using FIDs. FIG. 8 shows a number of functions for the class "animator" identified at line 902. For example, the "animator" class has an initialized function 904, a constructer function 906, and an init function 908, and a set start function 910. Each of the functions is associated with an FID as shown in each of the respective lines 904, 906, 908 and 910.

In a further unique aspect of the present invention, the serialized representation is created in an output file, which as shown in FIGS. 5 through 8, may be created in an extensible markup language (XML) format. It should be recognized that other formats may be utilized to store the serialized output of the present invention. The serialization process as described herein does not require that the interpreter know any property of any class, only what is in the class.

The serialization process does not prioritize objects during the serialization process. In order to handle all types of runtimes, including a presentation renderer such as FLASH wherein the content of the variable binding application cannot be introspected nor serialized, the serialization process uses single pass through the frozen application, and detaches each and every object as shown in FIG. 4.

In a further unique aspect, as described above, closures are handled in a different manner. Essentially, closure is a function which calls another function—a pair of a function and a variable binding environment within which the function is executed. The function code is present in the object file (O1). In one embodiment, the variable binding environment is computed at runtime. In some contexts, such as where the runtime environment is designed for a presentation renderer such as a FLASH player, the content of the variable binding environment cannot be introspected and therefore cannot be serialized. This therefore puts it in a different category than functions, assets and objects. Functions and assets are represented in the object file, and JAVASCRIPT objects are represented in the application state and can be introspected, and therefore both can be serialized. Closures are neither present in the object file nor can they be introspected.

In general, the solution represented in step 414 is two-fold: (1) to create a new function object that is used for each closure, so that no function is used in two different closures (with two different variable binding environments), and (2) to attach properties to the function that the rebuilder can use to create code that when executed will create a closure that isomorphic to the closure in the pre-serialized state.

An example of a closure is:

```
// f1
function f( ) {
    function g(x) {return x+1}
    return g;
}
```

If this is used to set a property of an object:
var object={ }
object.p=f( );
then the serialization should include the information that the 'p' property of object is the return value of f( ) (the inner function g). However, there is no way to represent this function because it is not a top-level function (which could be extracted from the object file), nor is it introspectable. Contrast with:
object.p1=f;
which binds object.p1 to an object that can be identified in the object file via its unique id, and to:
object.p2=1;
object.p3="string";
object.p4={a: 1, b: 2}
which bind properties of object to objects that are fully introspectable and can therefore be serialized in a way that allows isomorphic objects to be created when the rebuilt application is loaded.

The solution allows inner methods to be labeled with information that allows the rebuilder to create instructions that recreate isomorphic objects. For example, if the 'f' function has a unique id 'f001', its source code can be changed to:

```
// f2
function f( ) {
    function g(x) {return x+1}
    g.uid = 'f001( )'
}
``` the serializer can serialize the value of g.uid, and the rebuilder can interpret this as an instruction to place instructions in the rebuilt object file that will cause the runtime execution engine to call the function whose unique FID is 'f001' and use the result value of that function call as the value (in the state created from the rebuilt object file) that is isomorphic to the value of object.p1 in the pre-serialized state.

The function f could also be written as:

```
// f3
function f( ) {
    function g(x) {return x+1}
    g.uid = arguments.callee.uid + '( )'
}
``` to use runtime introspection to compute the UID of the inner function, instead.

If the function created several closures which could be incorporated into return values:

```
// f4
function f( ) {
    function g(x) {return x+1}
    function h(x) {return x+2}
    return [g,h]
}
``` it could be modified to take an extra argument that instructed it to return just one of the closures:

```
// f5
function f(which) {
    function g(x) {return x+1}
    g.uid = arguments.callee.uid + '(1)';
    function h(x) {return x+2}
    h.uid = arguments.callee.uid + '(2)';
    if (which == 1)
        return g;
    else if (which == 2)
        return h;
    return [g,h]
}
```

In these cases the closure's variable binding environment is empty. In the case where it is non-empty:

```
// f6
function f(y) {
    function g(x) {return x+y}
    return g;
}
    var obj = { }
    obj.p1 = f(1)
    obj.p2 = f(2)
``` binds obj.p1 and obj.p2 to two different closures that are behaviorally different because they contain the same function but are closed over different binding environments. In order to be serialized, this function could be rewritten as:

```
// f7
function f(y) {
    function g(x) {return arguments.callee.x + y}
    g.x = y;
    return g;
}
``` so that instead of the binding environment being represented implicitly, in a way that is invisible to introspection, it is represented explicitly.

In addition, the compiler can perform these transformations automatically, so that the programmer can write functions as f1, f4, and f6; and the compiler will compile these as though they had been written f2 or f3, f5, and f7, respectively.

The invention is applicable to any runtime which is utilized in association with an application. The invention provides a method for optimizing startup time of the application relative to the interpreter, without performing one of the normal methods of optimizing the application. Normally, in order to increase the startup time in application, a developer is required to optimize the interpreter for the application, optimize the application itself, or create its own presentation renderer. The method of the present invention bypasses many of these steps and increases the usability of any application, but especially those created using an interpreted language.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method for decreasing a computer application start-up time, comprising:

compiling application source code into a first object code file for a runtime environment, the first object code file including application objects, each marked with a unique identifier, and instructions defining relations between the application objects and built-in objects in the runtime environment;

processing the instructions to create relations between the application objects and built-in objects;

generating initialization code representing a first application state;

creating a serialized representation of the initialization code;

building an optimized object code file using the serialized representation and the first object code file, wherein the step of building includes:

identifying each application object in the serialized representation that has a unique identifier referring to an application object in the first object code file; and for each identified application object in the serialized representation, copying the application object in the initialization code with the same unique identifier to the optimized object code file;

loading the optimized object code file into a new runtime environment to create a second application state isomorphic to the first application state; and executing the optimized object code file in the new runtime environment.

2. The method of claim 1 wherein the step of creating a serialized representation includes:

reading from a runtime memory space a description of each application object of a running computer application.

3. The method of claim 1 wherein the step of creating a serialized representation includes enumerating a description of each application object of the computer application using reflection.

4. The method of claim 2 wherein the runtime environment is a virtual machine.

5. The method of claim 4 wherein the virtual machine is a presentation renderer.

6. The method of claim 1 wherein the step of creating a serialized representation comprises:

identifying each application object of a running computer application by a unique identifier.

7. The method of claim 6 wherein the step of creating a serialized representation comprises detaching each application object from an application object hierarchy and creating a description of each slot in said application object.

8. The method of claim 6 wherein the step of creating a serialized representation includes the step of providing the serialized representation directly to the building step.

9. The method of claim 1 wherein the serialized representation of application objects in a runtime environment is written in an Extensible Markup Language data format.

10. The method of claim 9 wherein the step of creating a serialized representation comprises storing a markup language file prior to said step of building.

11. The method of claim 1 wherein the step of creating a serialized representation comprises assigning a serialization identifier to each application object.

12. The method of claim 1 further including the step of developing the computer application in an interpreted language.

13. The method of claim 6 wherein the step of creating a serialized representation comprises:

assigning a function ID to each function in the computer application.

14. The method of claim 13 wherein the method further includes:

creating a function ID table associating each function ID with function code.

15. The method of claim 13 wherein the method further includes assigning unique function identifiers to functions within closures.

16. The method of claim 1 wherein the step of creating a serialized representation comprises:
   writing the serialized representation to a text file prior to said step of building.

17. The method of claim 1 wherein the step of creating a serialized representation is performed in a different runtime.

18. A method for providing an optimized application, comprising:
   compiling an application provided in a source language to create a first object code file containing application objects for a runtime environment, each application object being marked with a unique identifier, and instructions defining relations between the application objects and built-in objects in the runtime environment;
   initializing a first memory space that represents a first application state that contains built-in objects of the runtime environment;
   processing instructions in the application objects in the first object code file in order to add application objects and create relations within the first memory space to create a second memory space that represents a second application state;
   executing portions of the application marked for execution to create a third memory space that represents a third application state;
   creating a serialized representation of the third application state;
   building an optimized object code file using the serialized representation and the first object code file, wherein the step of building includes:
      identifying each application object in the serialized representation that has a unique identifier referring to an application object in the first object code file; and
      for each identified application object in the serialized representation, copying the application object in the third application state with the same unique identifier to the optimized object code file;
   loading the optimized object code file into a new runtime environment to create a fourth application state isomorphic to the third application state; and
   executing the optimized object code file in the new runtime environment.

19. The method of claim 18 wherein the step of creating comprises:
   reading from the runtime environment a description of each application object of the application.

20. The method of claim 19 wherein the step of creating further comprises:
   outputting the description to a rebuilder.

21. The method of claim 20 wherein the step of outputting comprises storing the serialized representation in a text file and providing the text file to the rebuilder.

22. The method of claim 20 wherein the step of outputting comprises:
   writing the description to an Extensible Markup Language file and providing the Extensible Markup Language file to the rebuilder.

23. The method of claim 18 wherein the runtime environment is a virtual machine.

24. The method of claim 23 wherein the virtual machine is a presentation renderer.

25. The method of claim 18 wherein the step of creating includes assigning a serialization identifier to each initialized application object.

26. The method of claim 18 wherein the step of creating includes the steps of enumerating each application object in a global scope and writing a serialized description of each said application object.

27. The method of claim 18 wherein the step of creating comprises:
   assigning a function ID to each function in the application.

28. The method of claim 27 wherein the method further includes:
   creating a function ID table associating each function ID with a function call.

29. The method of claim 27 wherein the method further includes assigning function identifiers to functions within closures.

30. A method of operating an application, comprising:
   requesting an application from an application source server;
   compiling the application provided in a source language to create a first object code file containing application objects for a runtime environment, each application object being marked with a unique identifier, and instructions defining relations between the application objects and built-in objects in the runtime environment;
   receiving the first object code file loaded into the runtime environment and creating a first application state;
   executing portions of the application marked for execution and creating a second application state;
   receiving an optimized object code file using a serialized description of the second application state and the first object code file, wherein the optimized object code file is built by:
      identifying each application object in the serialized representation that has a unique identifier referring to an application object in the first object code file; and
      for each identified application object in the serialized representation, copying the application object in the second application state with the same unique identifier to the optimized object code file;
   loading the optimized object code file into a new runtime environment to create a third application state isomorphic to the second application state; and
   executing the optimized object code file in the new runtime environment.

31. The method of claim 30 wherein the first object code file includes media assets.

32. The method of claim 30 wherein the runtime environment is a presentation renderer.

33. One or more processor readable storage devices having processor readable code embodied on said one or more processor readable storage devices, said processor readable code for programming one or more processors to perform a method for decreasing a computer application start-up time, comprising the steps of:
   compiling the computer application provided in a source language to create a first object code file containing application objects for a runtime environment, each application object being marked with a unique identifier, and instructions defining relations between the application objects and built-in objects in the runtime environment;
   receiving the first object code file loaded into the runtime environment and creating a first application state;
   executing portions of the computer application marked for execution to create a second application state;
   creating a serialized representation of the second application state;

building an optimized object code file using the serialized representation of the application objects and the first object code file, wherein the step of building includes:
    identifying each application object in the serialized representation that has a unique identifier referring to an application object in the first object code file; and
    for each identified application object in the serialized representation, copying the application object in the second application state with the same unique identifier to the optimized object code file;
loading the optimized object code file into a new runtime environment to create a third application state isomorphic to the second application state; and
executing the optimized object code file in the new runtime environment.

34. One or more processor readable storage devices as described in claim 33 wherein the step of creating includes:
    reading from a runtime environment memory space a description of each application object of a running application.

35. One or more processor readable storage devices as described in claim 33 wherein the step of creating includes enumerating a description of each application object of the computer application using reflection.

36. One or more processor readable storage devices as described in claim 33 wherein the step of creating comprises:
    identifying each application object of a running application by a unique identifier.

37. One or more processor readable storage devices as described in claim 36 wherein the step of creating comprises:
    writing a description to a text file and compiling the text file.

38. One or more processor readable storage devices as described in claim 36 wherein the step of creating comprises:
    writing a description to an Extensible Markup Language file and compiling a markup language file.

39. One or more processor readable storage devices as described in claim 36 wherein the step of creating comprises detaching each application object from an application object hierarchy and creating a description of each slot in said application object.

40. One or more processor readable storage devices as described in claim 36 wherein the step of creating further includes the steps of:
    determining whether the application object is a class; and
    writing a serialized description of the class.

41. One or more processor readable storage devices as described in claim 34 wherein the serialized representation of application objects in a runtime environment is written in an Extensible Markup Language data format.

42. One or more processor readable storage devices as described in claim 34 wherein the step of creating comprises assigning a serialization identifier to each application object.

43. One or more processor readable storage devices as described in claim 34 further including the step of developing the computer application in an interpreted language.

44. One or more processor readable storage devices as described in claim 36 wherein the step of creating comprises:
    assigning a function ID to each function in the computer application.

45. One or more processor readable storage devices as described in claim 44 wherein the method further includes:
    creating a function ID table associating each function ID with function code.

46. One or more processor readable storage devices as described in claim 44 wherein the method further includes assigning function identifiers to functions within closures.

47. A method for reducing the start-up time of an application, comprising:
    compiling the application provided in a source language into a first object code file for a first runtime environment, the first object code file including application objects, each marked with a unique identifier, and instructions defining relations between the application objects and built-in objects in the first runtime environment;
    loading the first object code file into the first runtime environment to create a first application state;
    executing portions of the application marked for execution to create a second application state;
    creating a serialized representation of the second application state;
    building a second object code file using the serialized representation and the first object code file, wherein the step of building includes:
        identifying each application object in the serialized representation that has a unique identifier referring to an application object in the first object code file; and
        for each identified application object in the serialized representation, copying the application object from the second application state with the same unique identifier to the second object code file;
    loading the second object code file into a second runtime environment to create a third application state isomorphic to the first second application state; and
    executing the second object code file in the second runtime environment.

48. The method of claim 47 wherein the step of compiling is performed on an interpreted language application.

49. The method of claim 47 wherein the step of creating is performed by calling at least one function from said first runtime environment.

50. The method of claim 47 wherein the step of creating is performed in the same runtime environment as said application.

51. The method of claim 47 wherein the step of creating is performed in a different runtime environment from said application.

52. A method for delivering an application via a network, the method comprising:
    compiling the application provided in a source language to create a first object code file containing application objects for a runtime environment, each application object being marked with a unique identifier;
    receiving the first object code file loaded into the runtime environment and creating a first application state;
    creating relations between application objects in the first object code file and built-in objects in the runtime environment to create a second application state;
    executing portions of the application marked for execution to create a third application state;
    creating a serialized representation of the third application state;
    building an optimized object code file using the serialized representation and the first object code file, wherein the step of building includes:
        identifying each application object in the serialized representation that has a unique identifier referring to an application object in the first object code file; and
        for each identified application object in the serialized representation, copying the application object from the third application state with the same unique identifier to the optimized object code file;

loading the optimized object code file into a new runtime environment via the network to create a fourth application state isomorphic to the third application state; and executing the optimized object code file in the new runtime environment.

53. The method of claim 52 wherein the step of creating includes enumerating a description of each application object of the application using reflection.

54. The method of claim 53 wherein the new runtime environment is a virtual machine.

55. The method of claim 54 wherein the virtual machine is a presentation renderer.

* * * * *

UNITED STATES PATENT AND TRADEMARK OFFICE
CERTIFICATE OF CORRECTION

PATENT NO. : 7,584,462 B2  Page 1 of 1
APPLICATION NO. : 10/720726
DATED : September 1, 2009
INVENTOR(S) : Wolff et al.

It is certified that error appears in the above-identified patent and that said Letters Patent is hereby corrected as shown below:

Col. 18, line 29: after "the" and before "second" --- delete "first"

Signed and Sealed this

Twenty-fourth Day of November, 2009

David J. Kappos
*Director of the United States Patent and Trademark Office*

UNITED STATES PATENT AND TRADEMARK OFFICE
CERTIFICATE OF CORRECTION

PATENT NO. : 7,584,462 B2  Page 1 of 1
APPLICATION NO. : 10/720726
DATED : September 1, 2009
INVENTOR(S) : Wolff et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1107 days.

Signed and Sealed this

Fourteenth Day of September, 2010

David J. Kappos
*Director of the United States Patent and Trademark Office*